(No Model.)
G. TALBOT.
HEATER FOR HOT WATER OR STEAM.
No. 568,994. Patented Oct. 6, 1896.
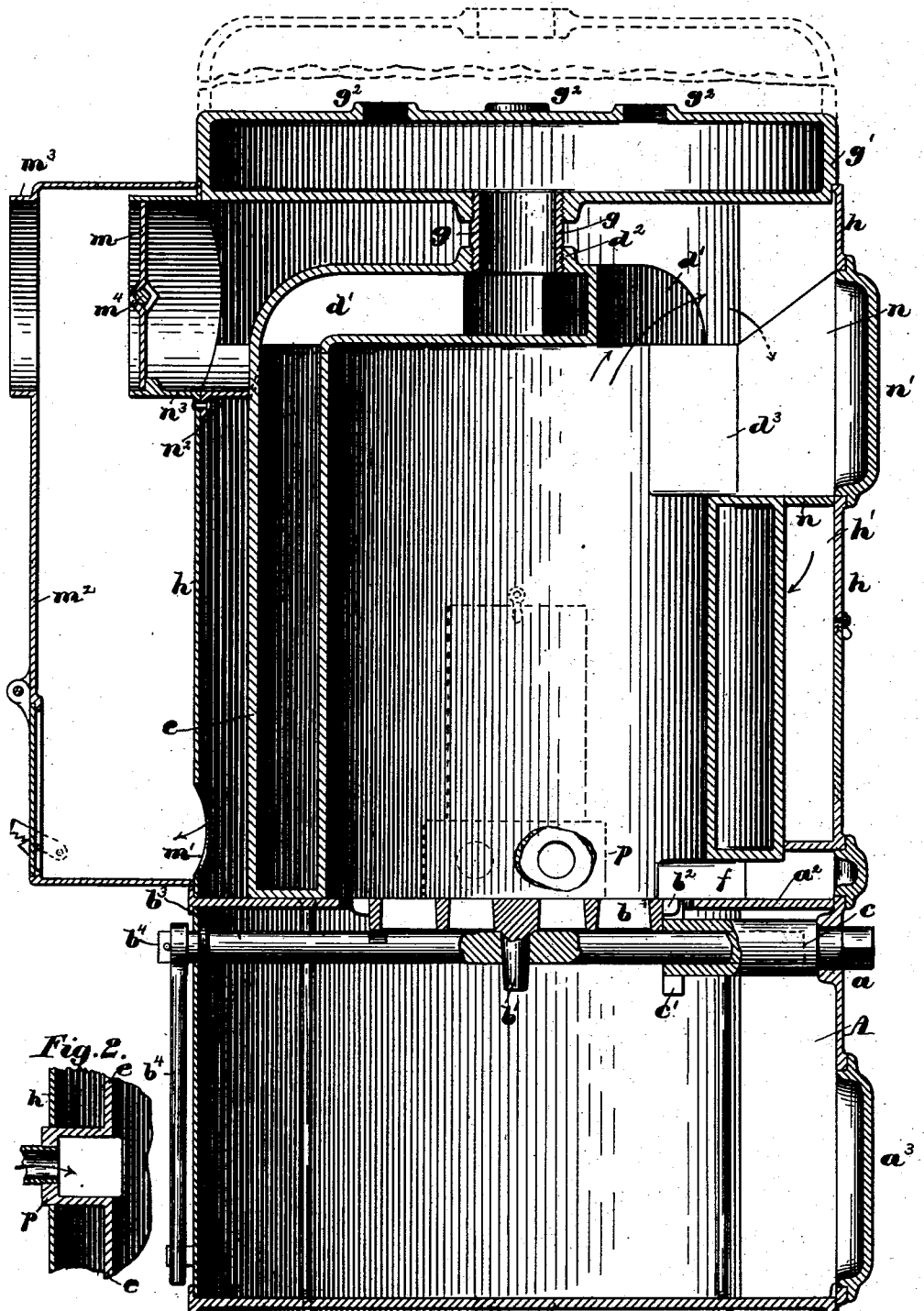
Witnesses:
Walter E. Lombard
Fred L. Greenleaf
Inventor:
George Talbot,
by Crosby & Gregory Attys.

UNITED STATES PATENT OFFICE.

GEORGE TALBOT, OF LYNN, MASSACHUSETTS, ASSIGNOR TO THE TALBOT HEATER MANUFACTURING COMPANY, OF MAINE.

HEATER FOR HOT WATER OR STEAM.

SPECIFICATION forming part of Letters Patent No. 568,994, dated October 6, 1896.

Application filed May 11, 1896. Serial No. 591,041. (No model.)

*To all whom it may concern:*

Be it known that I, GEORGE TALBOT, of Lynn, county of Essex, State of Massachusetts, have invented an Improvement in Heaters for Hot Water or Steam, of which the following description, in connection with the accompanying drawings, is a specification, like letters on the drawings representing like parts.

This invention has for its object the production of an improved furnace for heating hot water or generating steam for heating purposes.

My heater presents a fire-pot with double walls, leaving between them a water-chamber, the upper end of the fire-pot having connected inwardly-turned hollow spider-arms leading to an outlet through which the hot water or steam passes into a pressure-drum located above and joined to said spider, the periphery of the drum being shown as extended outwardly to present a diameter in excess of the external diameter of the fire-pot, so that the casing, extended from the periphery of the drum downwardly to the top of the ash-pit, will leave a space between the fire-pot and the interior of the casing for the circulation of the products of combustion from the fire-pot, so that the fire-pot is heated internally and externally.

Figure 1, in vertical section, shows a heater embodying my invention; and Fig. 2, a detail to be referred to.

The ash-pit A, composed of side walls $a$, bottom plate $a'$, and top plate $a^2$, and having a door $a^3$, is and may be of any usual or suitable shape. The top plate has a central opening, in which is mounted a grate $b$, having a pivot-pin $b'$ and a series of cog-teeth $b^2$ near its edge. The pivot $b'$ enters a socket or hole in a tipping-shaft $b^3$, provided with a handle $b^4$, by which to turn the shaft and tip the grate. One end of the shaft enters a sleeve $c$, properly supported in bearings of the ash-pit frame, and has at its outer end a squared or other end, to be engaged by a handle by which to rotate the sleeve and cause the gear-teeth $c'$ at its inner end to engage the teeth $b^2$ of the grate, to turn the same when desired to shake the coal, &c. The top plate supports the fire-pot $e$, composed of a cylindrical hollow casting, its inner and outer walls being separated to contain water to be heated.

The upper end of the fire-pot has three connected inwardly-directed hollow spider-arms $d'$, having, as shown, a common outlet $d^2$ just above the central part of the fire-pot.

The fire-pot has near its top a space or notch $d^3$ to enable the coal or other fuel to be put into the fire-box, and below said notch there is a space $f$ for the insertion of a "slicer-bar." The outlet $d^3$ has screwed into it a nipple $g$, which enters the pressure-drum $g'$, having suitable outlets $g^2$ in any desired numbers.

The water as it becomes heated in the fire-pot, which becomes a boiler, rises through the nipple and enters the drum, and from thence circulates through suitable pipes joined to the outlets $g^2$ and leading to the rooms to be heated.

If steam is to be used, the drum shown in full lines will be removed and a higher drum of greater capacity, partially represented by dotted lines, will be put in its place.

The drum is of greater diameter than the fire-pot, substantially the diameter of the ash-pit, so that when the metallic casing $h$ is applied from the periphery of the drum to the ash-pit a space $h'$ will be left all about the fire-pot, so that the products of combustion rising from the top of the fire-pot will, when the main draft-damper $m$ is closed, as it will be except when the fire is first started, pass downwardly about the fire-pot and to the outlet $m'$ and up the pipe or flue $m^2$, out through the collar $m^3$, connected by a suitable stove-pipe with a chimney. The space $h'$ is blocked between the casing and the notch $a^3$ by a U-shaped plate $n$ just below and extended upwardly at the sides of the feed-door $n'$, and by a plate $n^2$ just below the under side of the pipe $n^3$, containing the main damper $m$ on shaft $m^4$.

The drum shown by full lines is of sufficient size for hot-water circulation, but for steam circulation I remove the drum $g'$ and put in place of it a deeper drum, to afford space for the steam.

The lower part of the fire-pot has at opposite sides a box $o$, (see Fig. 2 and dotted lines, Fig. 1,) which extends to and through the casing $h$, the box being tapped to receive the cold-water or feed pipe $p$.

I may, if desired, add any desired number of drums, one above the other, connecting them by suitable nipples to insure circulation of the water or steam, whichever is used.

Having described my invention, what I claim as new, and desire to secure by Letters Patent, is—

In a heater, a double-wall or hollow fire-box, provided at its upper end with connected hollow spiders or arms, extended across the fire-pot and having a common outlet, a drum of greater diameter than and mounted above said fire-pot and in communication with said outlet, and a surrounding jacket or casing depending from the periphery of the said drum, the said casing being separated from the exterior of said fire-pot to leave a space for the products of combustion to pass, the bottom of the drum directing the products of combustion into said space, substantially as described.

In testimony whereof I have signed my name to this specification in the presence of two subscribing witnesses.

GEORGE TALBOT.

Witnesses:
GEO. W. GREGORY,
EMMA J. BENNETT.